(12) United States Patent
Moshfeghi

(10) Patent No.: US 10,284,344 B2
(45) Date of Patent: *May 7, 2019

(54) METHOD AND SYSTEM FOR CENTRALIZED DISTRIBUTED TRANSCEIVER MANAGEMENT

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,209

(22) Filed: Feb. 23, 2017

(65) Prior Publication Data

US 2017/0230099 A1 Aug. 10, 2017

Related U.S. Application Data

(63) Continuation of application No. 14/813,058, filed on Jul. 29, 2015, now Pat. No. 9,602,257, which is a
(Continued)

(51) Int. Cl.
*H04B 7/00* (2006.01)
*H04L 5/00* (2006.01)
(Continued)

(52) U.S. Cl.
CPC ............ *H04L 5/0032* (2013.01); *H04B 1/40* (2013.01); *H04B 7/024* (2013.01); *H04B 7/043* (2013.01);
(Continued)

(58) Field of Classification Search
CPC ..... H04W 28/16; H04W 28/18; H04W 28/20; H04W 28/22; H04W 52/02; H04W 72/0406; H04W 88/04; H04W 92/16
(Continued)

(56) References Cited

U.S. PATENT DOCUMENTS 3,618,097 A 11/1971 McLeod, Jr.
5,525,990 A 6/1996 Lewis
(Continued)

FOREIGN PATENT DOCUMENTS

WO WO 2013/058998 4/2013
WO WO 2013/058999 4/2013

OTHER PUBLICATIONS

U.S. Appl. No. 15/706,759, filed Sep. 17, 2017, Moshfeghi, Mehran.
(Continued)

*Primary Examiner* — Dmitry Levitan
(74) *Attorney, Agent, or Firm* — Makoui Law, PC

(57) ABSTRACT

A master application device comprises a plurality of distributed transceivers, a central baseband processor, and a network management engine that manages operation of the master application device and end-user application devices. The master application device communicates data streams to the end-user devices utilizing one or more distributed transceivers selected from the plurality of distributed transceivers. The selected distributed transceivers are dynamically configured to switch between spatial diversity mode, frequency diversity mode, multiplexing mode and MIMO mode based on corresponding link quality and propagation environment. Digital signal processing needed for the selected distributed transceivers is performed by the central baseband processor. The network management engine continuously monitors communication environment information to configure beamforming settings and/or antenna
(Continued)

arrangement for the selected distributed transceivers. Connection types, communication protocols, and/or transceiver operation modes are determined for the selected distributed transceivers. Resources are allocated to the selected distributed transceivers to continue subsequent data communication.

28 Claims, 10 Drawing Sheets

Related U.S. Application Data continuation of application No. 13/473,096, filed on May 16, 2012, now Pat. No. 9,112,648.

(60) Provisional application No. 61/548,201, filed on Oct. 17, 2011.

(51) Int. Cl.
| | |
|---|---|
| *H04B 7/0408* | (2017.01) |
| *H04B 7/0426* | (2017.01) |
| *H04B 1/40* | (2015.01) |
| *H04L 27/12* | (2006.01) |
| *H04W 4/80* | (2018.01) |
| *H04W 88/06* | (2009.01) |
| *H04B 7/06* | (2006.01) |
| *H04W 88/02* | (2009.01) |
| *H04W 72/08* | (2009.01) |
| *H04B 7/0413* | (2017.01) |
| *H04B 7/08* | (2006.01) |
| *H04W 24/08* | (2009.01) |
| *H04W 72/04* | (2009.01) |
| *H04B 7/024* | (2017.01) |
| *H04W 84/12* | (2009.01) |

(52) U.S. Cl.
CPC ......... *H04B 7/0408* (2013.01); *H04B 7/0413* (2013.01); *H04B 7/0689* (2013.01); *H04B 7/0897* (2013.01); *H04L 27/12* (2013.01); *H04W 4/80* (2018.02); *H04W 24/08* (2013.01); *H04W 72/046* (2013.01); *H04W 72/0453* (2013.01); *H04W 72/0473* (2013.01); *H04W 72/085* (2013.01); *H04W 88/02* (2013.01); *H04W 88/06* (2013.01); *H04W 84/12* (2013.01); *Y02D 70/00* (2018.01); *Y02D 70/122* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/22* (2018.01); *Y02D 70/444* (2018.01)

(58) Field of Classification Search
USPC .................................. 370/310, 315, 328, 329
See application file for complete search history.

(56) References Cited

U.S. PATENT DOCUMENTS

| | | | |
|---|---|---|---|
| 5,936,577 A | 8/1999 | Shoki et al. |
| 6,018,316 A | 1/2000 | Rudish et al. |
| 6,487,417 B1 | 11/2002 | Rossoni |
| 6,600,776 B1 | 7/2003 | Alamouti |
| 6,718,159 B1 | 4/2004 | Sato |
| 6,802,035 B2 | 10/2004 | Catreux et al. |
| 7,058,367 B1 | 6/2006 | Luo et al. |
| 7,187,949 B2 | 3/2007 | Chang et al. |
| 7,248,217 B2 | 7/2007 | Mani et al. |
| 7,260,141 B2 | 8/2007 | Bierly et al. |
| 7,333,455 B1 | 2/2008 | Bolt |
| 7,574,236 B1 | 8/2009 | Mansour |
| 7,636,573 B2 | 12/2009 | Walton et al. |
| 7,688,909 B2 | 3/2010 | Tsutsui |
| 7,689,216 B2 | 3/2010 | Wandel et al. |
| 7,710,319 B2 | 5/2010 | Nassiri-Toussi et al. |
| 7,890,114 B2 | 2/2011 | Braun et al. |
| 7,904,117 B2 | 3/2011 | Doan et al. |
| 7,986,742 B2 | 7/2011 | Ketchum et al. |
| 8,098,752 B2 | 1/2012 | Hwang et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,175,184 B2 | 5/2012 | Kim |
| 8,203,978 B2 | 6/2012 | Walton et al. |
| 8,279,132 B2 | 10/2012 | Jung et al. |
| 8,280,445 B2 | 10/2012 | Yong et al. |
| 8,320,304 B2 | 11/2012 | Deb et al. |
| 8,364,188 B2 | 1/2013 | Srinivasan et al. |
| 8,369,791 B2 | 2/2013 | Hafeez |
| 8,385,305 B1 | 2/2013 | Negus et al. |
| 8,385,452 B2 | 2/2013 | Gorokhov |
| 8,396,157 B2 | 3/2013 | Li et al. |
| 8,570,988 B2 | 10/2013 | Wallace et al. |
| 8,620,301 B1 | 12/2013 | Hessel |
| 8,644,262 B1 | 2/2014 | Sun et al. |
| 8,654,815 B1 | 2/2014 | Forenza et al. |
| 8,750,264 B2 | 6/2014 | Shatti |
| 8,780,943 B2 | 7/2014 | Moshfeghi |
| 8,787,469 B2 | 7/2014 | Kim |
| 8,817,678 B2 | 8/2014 | Moshfeghi |
| 8,854,255 B1 | 10/2014 | Ehret |
| 8,885,628 B2 | 11/2014 | Palanki et al. |
| 9,037,094 B2 | 5/2015 | Moshfeghi |
| 9,112,648 B2 | 8/2015 | Moshfeghi |
| 9,185,601 B2 | 11/2015 | Frerking |
| 9,197,982 B2 | 11/2015 | Moshfeghi |
| 9,225,482 B2 | 12/2015 | Moshfeghi |
| 9,226,092 B2 | 12/2015 | Moshfeghi |
| 9,253,587 B2 | 2/2016 | Moshfeghi |
| 9,438,389 B2 | 9/2016 | Moshfeghi |
| 9,548,805 B2 | 1/2017 | Moshfeghi |
| 9,602,257 B2 | 3/2017 | Moshfeghi |
| 9,660,777 B2 | 5/2017 | Moshfeghi |
| 9,680,554 B2 | 6/2017 | Moshfeghi |
| 9,686,060 B2 | 6/2017 | Moshfeghi |
| 9,698,948 B2 | 7/2017 | Moshfeghi |
| 9,736,637 B2 | 8/2017 | Larsen |
| 9,780,928 B2 | 10/2017 | Moshfeghi |
| 9,923,620 B2 | 3/2018 | Moshfeghi |
| 10,020,861 B2 | 7/2018 | Moshfeghi |
| 10,069,608 B2 | 9/2018 | Moshfeghi |
| 10,084,576 B2 | 9/2018 | Moshfeghi |
| 10,103,853 B2 | 10/2018 | Moshfeghi |
| 2002/0196186 A1 | 12/2002 | Holt |
| 2003/0012208 A1 | 1/2003 | Bernheim et al. |
| 2003/0125040 A1 | 7/2003 | Walton et al. |
| 2003/0129989 A1 | 7/2003 | Gholmieh et al. |
| 2004/0077354 A1 | 4/2004 | Jason et al. |
| 2004/0082356 A1 | 4/2004 | Walton et al. |
| 2004/0095907 A1 | 5/2004 | Agee et al. |
| 2004/0116129 A1 | 6/2004 | Wilson |
| 2004/0166808 A1 | 8/2004 | Hasegawa et al. |
| 2005/0048964 A1 | 3/2005 | Cohen et al. |
| 2005/0088358 A1 | 4/2005 | Larry et al. |
| 2005/0136943 A1 | 6/2005 | Banerjee et al. |
| 2005/0181755 A1 | 8/2005 | Hoshino et al. |
| 2005/0232216 A1 | 10/2005 | Webster et al. |
| 2005/0237971 A1 | 10/2005 | Skraparlis |
| 2005/0243756 A1 | 11/2005 | Cleveland et al. |
| 2006/0063494 A1 | 3/2006 | Zhang et al. |
| 2006/0121946 A1 | 6/2006 | Walton et al. |
| 2007/0052519 A1 | 3/2007 | Talty et al. |
| 2007/0066254 A1 | 3/2007 | Tsuchie |
| 2007/0093270 A1 | 4/2007 | Lagnado |
| 2007/0100548 A1 | 5/2007 | Small |
| 2007/0116012 A1 | 5/2007 | Chang et al. |
| 2008/0166975 A1 | 7/2008 | Kim et al. |

(56) References Cited

U.S. PATENT DOCUMENTS

| | | |
|---|---|---|
| 2008/0212582 A1 | 9/2008 | Zwart et al. |
| 2008/0261509 A1 | 10/2008 | Sen |
| 2008/0305820 A1 | 12/2008 | Sadiq et al. |
| 2009/0093265 A1 | 4/2009 | Kimura et al. |
| 2009/0156227 A1 | 6/2009 | Frerking et al. |
| 2009/0161235 A1 | 6/2009 | Border |
| 2009/0233545 A1 | 9/2009 | Sutkover |
| 2009/0325479 A1 | 12/2009 | Chakrabarti et al. |
| 2010/0080197 A1 | 4/2010 | Kanellakis et al. |
| 2010/0090898 A1 | 4/2010 | Gallagher et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 | 6/2010 | Rofougaran |
| 2010/0172309 A1 | 7/2010 | Forenza et al. |
| 2010/0220012 A1 | 9/2010 | Reede |
| 2010/0273504 A1 | 10/2010 | Bull et al. |
| 2010/0291918 A1 | 11/2010 | Suzuki |
| 2010/0304680 A1 | 12/2010 | Kuffner et al. |
| 2010/0304770 A1 | 12/2010 | Wietfeldt et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0069773 A1 | 3/2011 | Doron et al. |
| 2011/0105032 A1 | 5/2011 | Maruhashi et al. |
| 2011/0105167 A1 | 5/2011 | Pan et al. |
| 2011/0140954 A1 | 6/2011 | Fortuny-Guasch |
| 2011/0194504 A1 | 8/2011 | Gorokhov et al. |
| 2011/0212684 A1 | 9/2011 | Nam et al. |
| 2011/0299441 A1 | 12/2011 | Petrovic |
| 2012/0002742 A1 | 1/2012 | Cheng |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0149300 A1 | 6/2012 | Forster |
| 2012/0184203 A1 | 7/2012 | Tulino et al. |
| 2012/0184219 A1 | 7/2012 | Richardson |
| 2012/0194385 A1 | 8/2012 | Schmidt et al. |
| 2012/0230274 A1 | 9/2012 | Xiao et al. |
| 2012/0238202 A1 | 9/2012 | Kim et al. |
| 2012/0314570 A1 | 12/2012 | Forenza et al. |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0095747 A1 | 4/2013 | Moshfeghi |
| 2013/0114468 A1 | 5/2013 | Hui et al. |
| 2013/0155891 A1 | 6/2013 | Dinan |
| 2013/0272437 A1 | 10/2013 | Edison |
| 2014/0010319 A1 | 1/2014 | Baik et al. |
| 2014/0045541 A1 | 2/2014 | Moshfeghi |
| 2014/0086191 A1 | 3/2014 | Berntsen |
| 2014/0133435 A1 | 5/2014 | Forenza |
| 2014/0241296 A1 | 8/2014 | Shattil |
| 2015/0241020 A1 | 8/2015 | Lee |
| 2016/0211905 A1 | 7/2016 | Moshfeghi |
| 2017/0126374 A1 | 5/2017 | Moshfeghi |
| 2017/0156069 A1 | 6/2017 | Moshfeghi |
| 2017/0279573 A1 | 9/2017 | Moshfeghi |
| 2017/0317734 A1 | 11/2017 | Moshfeghi |
| 2017/0317801 A1 | 11/2017 | Moshfeghi |
| 2017/0338921 A1 | 11/2017 | Moshfeghi |
| 2018/0091270 A1 | 3/2018 | Moshfeghi |
| 2018/0234158 A1 | 8/2018 | Moshfeghi |

OTHER PUBLICATIONS

U.S. Appl. No. 15/853,537, filed Dec. 22, 2017, Moshfeghi, Mehran.
U.S. Appl. No. 15/893,626, filed Feb. 10, 2018, Moshfeghi, Mehran.
Portions of prosecution history of U.S. Appl. No. 13/473,083, Apr. 17, 2015, Moshfeghi, Mehran.
Portions of prosecution history of U.S. Appl. No. 14/709,136, Jun. 1, 2017, Moshfeghi, Mehran.
Portions of prosecution history of U.S. Appl. No. 15/616,911, Nov. 9, 2017, Moshfeghi, Mehran.
Portions of prosecution history of U.S. Appl. No. 13/473,096, Jul. 20, 2015, Moshfeghi, Mehran.
Portions of prosecution history of U.S. Appl. No. 14/813,058, Feb. 17, 2017, Moshfeghi, Mehran.
Portions of prosecution history of U.S. Appl. No. 13/473,105, Jul. 30, 2014, Moshfeghi, Mehran.
Portions of prosecution history of U.S. Appl. No. 14/455,859, Aug. 12, 2016, Moshfeghi, Mehran.
Portions of prosecution history of U.S. Appl. No. 15/229,135, Mar. 20, 2018, Moshfeghi, Mehran.
Portions of prosecution history of U.S. Appl. No. 13/473,113, Nov. 24, 2015, Moshfeghi, Mehran.
Portions of prosecution history of U.S. Appl. No. 14/980,281, May 17, 2017, Moshfeghi, Mehran.
Portions of prosecution history of U.S. Appl. No. 15/595,940, Nov. 17, 2017, Moshfeghi, Mehran.
Portions of prosecution history of U.S. Appl. No. 13/473,160, Sep. 5, 2017, Moshfeghi, Mehran.
Portions of prosecution history of U.S. Appl. No. 13/473,144, Dec. 7, 2017, Moshfeghi, Mehran.
Portions of prosecution history of U.S. Appl. No. 15/853,537, Dec. 22, 2017, Moshfeghi, Mehran.
Portions of prosecution history of U.S. Appl. No. 13/473,180, Jun. 11, 2014, Moshfeghi, Mehran.
Portions of prosecution history of U.S. Appl. No. 14/325,218, Apr. 20, 2017, Moshfeghi, Mehran.
Portions of prosecution history of U.S. Appl. No. 15/472,148, Oct. 4, 2017, Moshfeghi, Mehran.
Portions of prosecution history of U.S. Appl. No. 13/919,958, Jan. 6, 2016, Moshfeghi, Mehran.
Portions of prosecution history of U.S. Appl. No. 13/919,932, Feb. 28, 2018, Moshfeghi, Mehran.
Portions of prosecution history of U.S. Appl. No. 13/919,967, Nov. 20, 2015, Moshfeghi, Mehran.
Portions of prosecution history of U.S. Appl. No. 14/980,338, Oct. 31, 2017, Moshfeghi, Mehran.
Portions of prosecution history of U.S. Appl. No. 15/893,626, Jul. 28, 2017, Moshfeghi, Mehran.
Portions of prosecution history of U.S. Appl. No. 13/919,922, Oct. 27, 2015, Moshfeghi, Mehran.
Portions of prosecution history of U.S. Appl. No. 14/940,130, May 4, 2017, Moshfeghi, Mehran.
Portions of prosecution history of U.S. Appl. No. 15/595,919, Nov. 9, 2017, Moshfeghi, Mehran.
Portions of prosecution history of U.S. Appl. No. 13/919,972, Dec. 20, 2016, Moshfeghi, Mehran.
Portions of prosecution history of U.S. Appl. No. 15/372,417, Sep. 28, 2017, Moshfeghi, Mehran.
International Search Report and Written Opinion of PCT/US2012/058839, dated Jan. 4, 2013, Golba LLC.
International Search Report and Written Opinion of PCT/US2012/058842, dated Jan. 4, 2013, Golba LLC.
U.S. Appl. No. 16/016,619, filed Jun. 24, 2018, Moshfeghi, Mehran.
U.S. Appl. No. 16/101,044, filed Aug. 10, 2018, Moshfeghi, Mehran.
U.S. Appl. No. 16/125,757, filed Sep. 9, 2018, Moshfeghi, Mehran.
U.S. Appl. No. 16/129,413, filed Sep. 12, 2018, Moshfeghi, Mehran.
U.S. Appl. No. 16/129,423, filed Sep. 12, 2018, Moshfeghi, Mehran.
U.S. Appl. No. 16/153,735, filed Oct. 6, 2018, Moshfeghi, Mehran.
U.S. Appl. No. 16/231,903, filed Dec. 24, 2018, Moshfeghi, Mehran.
Portions of prosecution history of U.S. Appl. No. 13/473,144, Aug. 29, 2018, Moshfeghi, Mehran.
Portions of prosecution history of U.S. Appl. No. 15/229,135, Sep. 5, 2018, Moshfeghi, Mehran.
Portions of prosecution history of U.S. Appl. No. 15/372,417, Dec. 7, 2018, Moshfeghi, Mehran.
Portions of prosecution history of U.S. Appl. No. 15/472,148, Dec. 10, 2018, Moshfeghi, Mehran.

(56) References Cited

OTHER PUBLICATIONS

Portions of prosecution history of U.S. Appl. No. 15/595,940, Aug. 21, 2018, Moshfeghi, Mehran.
Portions of prosecution history of U.S. Appl. No. 15/706,759, Jun. 12, 2018, Moshfeghi, Mehran.
Portions of prosecution history of U.S. Appl. No. 15/853,537, Sep. 26, 2018, Moshfeghi, Mehran.
Portions of prosecution history of U.S. Appl. No. 15/893,626, Jun. 12, 2018, Moshfeglii, Mehran.
Portions of prosecution history of U.S. Appl. No. 16/016,619, Sep. 25, 2018, Moshfeghi, Mehran.

METHOD AND SYSTEM FOR CENTRALIZED DISTRIBUTED TRANSCEIVER MANAGEMENT

CROSS-REFERENCE TO RELATED APPLICATIONS/INCORPORATION BY REFERENCE

This patent application is a continuation application of U.S. patent application Ser. No. 14/813,058, filed Jul. 29, 2015, published as U.S. Patent Publication 2016/0043838. U.S. patent application Ser. No. 14/813,058 is a continuation application of U.S. patent application Ser. No. 13/473,096, filed May 16, 2012, issued as U.S. Pat. No. 9,112,648. U.S. patent application Ser. No. 13/473,096, claims priority to and claims benefit from U.S. Provisional Patent Application Ser. No. 61/548,201 filed on Oct. 17, 2011. U.S. patent application Ser. No. 14/813,058 published as U.S. Patent Publication 2016/0043838 and U.S. patent application Ser. No. 13/473,096, issued as U.S. Pat. No. 9,112,648 are incorporated herein by reference.

This application makes reference to:

U.S. application Ser. No. 13/473,144, filed on May 16, 2012, published as U.S. Patent Publication 2013-0095747;

U.S. application Ser. No. 13/473,105, filed on May 16, 2012, issued as U.S. Pat. No. 8,817,678;

U.S. application Ser. No. 13/473,160, filed on May 16, 2012, issued as U.S. Pat. No. 9,780,928;

U.S. application Ser. No. 13/473,180, filed on May 16, 2012, issued as U.S. Pat. No. 8,780,943;

U.S. application Ser. No. 13/473,113, filed on May 16, 2012, issued as U.S. Pat. No. 9,225,482; and U.S. application Ser. No. 13/473,083, filed on May 16, 2012, issued as U.S. Pat. No. 9,037,094.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for centralized distributed transceiver management.

BACKGROUND OF THE INVENTION

Millimeter Wave (mmWave) devices are being utilized for high throughput wireless communications at very high carrier frequencies. There are several standards bodies such as 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for centralized distributed transceiver management, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for centralized distributed transceiver management. In accordance with various exemplary embodiments of the invention, a single network management engine is utilized to manage operation of a master application device and a plurality of end-user application devices that are served or managed by the master application device in a communication network. The master application device comprises a plurality of distributed transceivers, a central baseband processor, and the network management engine. An end-user application device served by the master application device does not comprise the network management engine and has no access to manage the network management engine. The master application device may communicate data streams utilizing one or more distributed transceivers selected from the plurality of the distributed transceivers to one or more end-user devices. The network management engine may dynamically configure the selected one or more distributed transceivers to switch between different operation modes, for example, spatial diversity mode, frequency diversity mode, multiplexing mode and MIMO mode, based on corresponding link quality and propagation environment. The central baseband processor may perform digital signal processing needed for transmit and receive operations for each of the selected one or more distributed transceivers. The network management engine may continuously monitor communication environment information such as propagation environment conditions, link quality, device capabilities, usage of resources, available resources, device locations, target throughput, and/or application QoS requirements. Beamforming settings and/or antenna arrangement may be configured for the selected one or more distributed transceivers based on the communication environment information. The network management engine may determine connection types, communication protocols, and/or transceiver operation modes for the selected one or more distributed transceivers and may allocate resources such as frequencies, time slots, processor, and/or storage to the selected one or more distributed transceivers to continue subsequent data communication. The allocated resources may be shared among the distributed transceivers by session transferring, for example.

Figure 1:
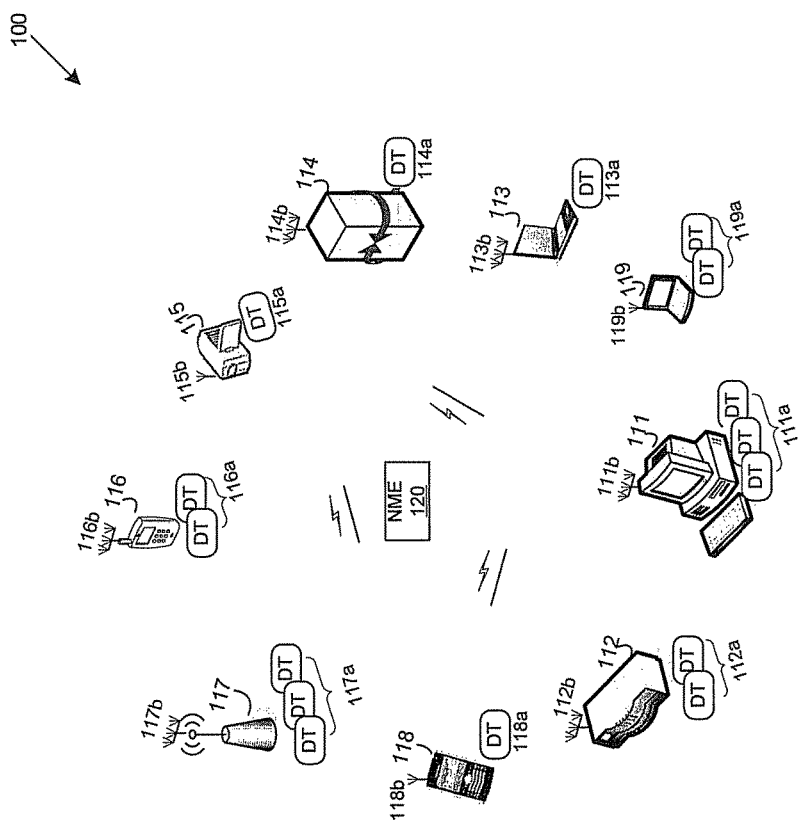
FIG. 1 is a block diagram illustrating an exemplary communication system that support centralized distributed transceiver management, in accordance with an embodiment of the invention.

FIG. 1 is a block diagram illustrating an exemplary communication system that support centralized distributed transceiver management, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications.

In an exemplary operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as images, video, voice, as well as any other form of data to one or more receiving devices such as the end-user application devices 112-116, the network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b, and to coordinate and manage the operation of the distributed transceivers 111a-116a and associated antenna or antenna array 111b-116b based on the collected communication environment information supplied from the end-user application devices 112-116. In this regard, the network management engine 120 may configure a single application device such as the application device 117 to maintain continuous connection with multiple different application devices such as the application devices 111-113. The application device capabilities may comprise battery life, number of transceivers, number of antennas per transceiver, device interface types, processing protocols, service types, service classes and/or service requirements. The interface types for the application devices 111-119 may comprise access interface types such as Multimedia over Coax Alliance (MoCa), WiFi, Bluetooth, Ethernet, Femtocell, and/or cordless. The processing protocols may comprise service layer protocols, IP layer protocols and link layer protocols, as specified, for example, in the Open Systems Interconnect (OSI) model.

The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention.

Figure 2:
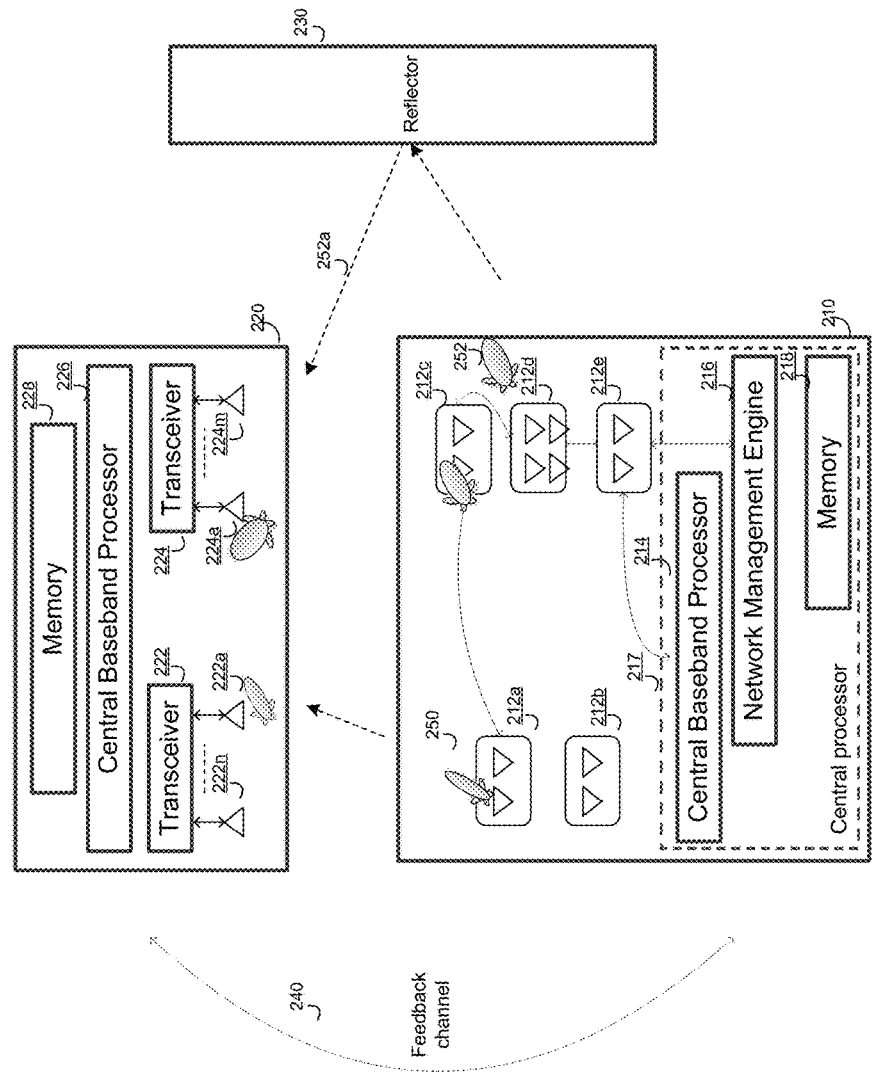
FIG. 2 is a diagram that illustrates an exemplary usage scenario where distributed transceivers are centrally managed to create a high-performance link between a transmitting device and one receiving device, in accordance with an embodiment of the invention.

FIG. 2 is a diagram that illustrates an exemplary usage scenario where utilizes distributed transceivers to create a high-performance link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN, 60 GHz/mmWave, and/or WiMAX, for example.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, and/or packet processing associated with the operation of the collection of distributed transceivers 212a through 212e. In addition, the central baseband processor 224 may be operable to configure, manage and control orientations of the distributed transceivers 212a-212e.

The network management engine 216 may comprise suitable logic, circuitry, interfaces and/or code that may be operable to monitor and collect communication environment information such as propagation environment conditions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers that are activated, the number of application devices that are being communicated with, adding/dropping application devices to the communication network 100. As shown in FIG. 2, the network management engine 216 is residing in the master application device 210. However, in some embodiments the network management engine 216 may reside on different network devices such as separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

In some embodiments of the invention, a single device, the master application device 210 or the end-user application device 220, for example, may be configured to deploy a number of baseband processors to implement the system and data processing requirements/demands. For example, several baseband processors may be deployed within the single device to generate and/or decode different data streams transmitted/received by several distributed transceivers. In this configuration, the network management engine 216 may also be operable to control and/ir coordinate the operation of the multiple baseband processors within the single device. In this regard, several internal connection topologies may be used or implemented. In some embodiments of the invention, each baseband processor in the single device may be dedicated to a subset of distributed transceivers and either ring/star topologies may be used. In this case, there may be no data transfer between the subsets of distributed transceivers. In another embodiment of the invention, the entire baseband processors and distributed transceivers within the single device may be connected together through a ring topology (using a single cable). In this regard, the baseband processors within the single device may be coordinated to share the cable by utilizing time-multiplexing at the same IF frequency or frequency-multiplexing at different IF frequencies. The baseband processors within the single device may have different power/processing/communication characteristics. In some embodiments of the invention, one or more baseband processors that are most suitable for a mode of operation (e.g., lower power consumption meeting the throughput requirement) may be activated and other baseband processors may be disabled for power saving.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as flash memory and/or other suitable electronic data storage.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212a through 212e so as to transmit an independent different data stream to the end-user application device 220 over each distributed transceiver and through each strong reflector. For example, the master application device 210 transmits two data streams to the end-user application device 220 using two different distributed transceivers 212a and 212d that may use the same frequency channel. In particular, the distributed transceivers 212a may choose a beam pattern 250 and orientation for a direct line of sight (LOS) to a transceiver 222, for example, of the end-user application device 220 (the receiving device) and transmit a first data stream over a carrier frequency $RF_1$. On the other hand, the distributed transceivers 212d may choose a beam pattern 252 and orientation that is pointing towards the reflector 230 and transmit a second data stream also over the same carrier frequency $RF_1$. The reflector 230 then may reflect the beam 252 towards a different transceiver 224 of the end-user application device 220. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as the number of users, number of streams needed, and/or available frequency channels. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2 shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality between the different paths. In FIG. 2, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2 may comprise the same data content and the use of LOS path and one or more reflector paths may provide link robustness for data content in case an obstacle blocks some of the paths.

In an exemplary embodiment of the invention, the master application device 210 may continuously monitor and collect propagation environment conditions, link quality, device capabilities, locations, target throughput, and/or application QoS requirements reported from the end-user application device 220. In this regard, a feedback or negotiation channel 240 may be utilized to exchange and negotiate system configurations such as number of transceivers within devices, number of antennas per transceivers, the measured channel responses, the sequence of antenna array coefficients being evaluated, and/or device location. The feedback or negotiation channel 240 may be implemented through a WLAN, Bluetooth, and/or 60 GHz link, for example.

In some embodiments of the invention, the distributed transceivers 212a-212e are mounted and installed on a surface. The surface may just be a flat plane or a parabolic surface. The transceivers' locations and orientations on the surface may either be deterministic (through a controlled process of installation) or determined in a calibration and/or optimizing phase. This set of distributed transceivers may then be configured jointly or concurrently in terms of their antenna patterns and/or beamforming weights so as to emulate and create a different effective antenna pattern (superposition of all individual antenna patterns). For example, the distributed transceivers 212a-212e may be configured jointly or concurrently to create a highly focused and directional antenna pattern. The direction and shape of the equivalent patterns may be adjusted by adjusting the individual antenna patterns accordingly.

Figure 3:
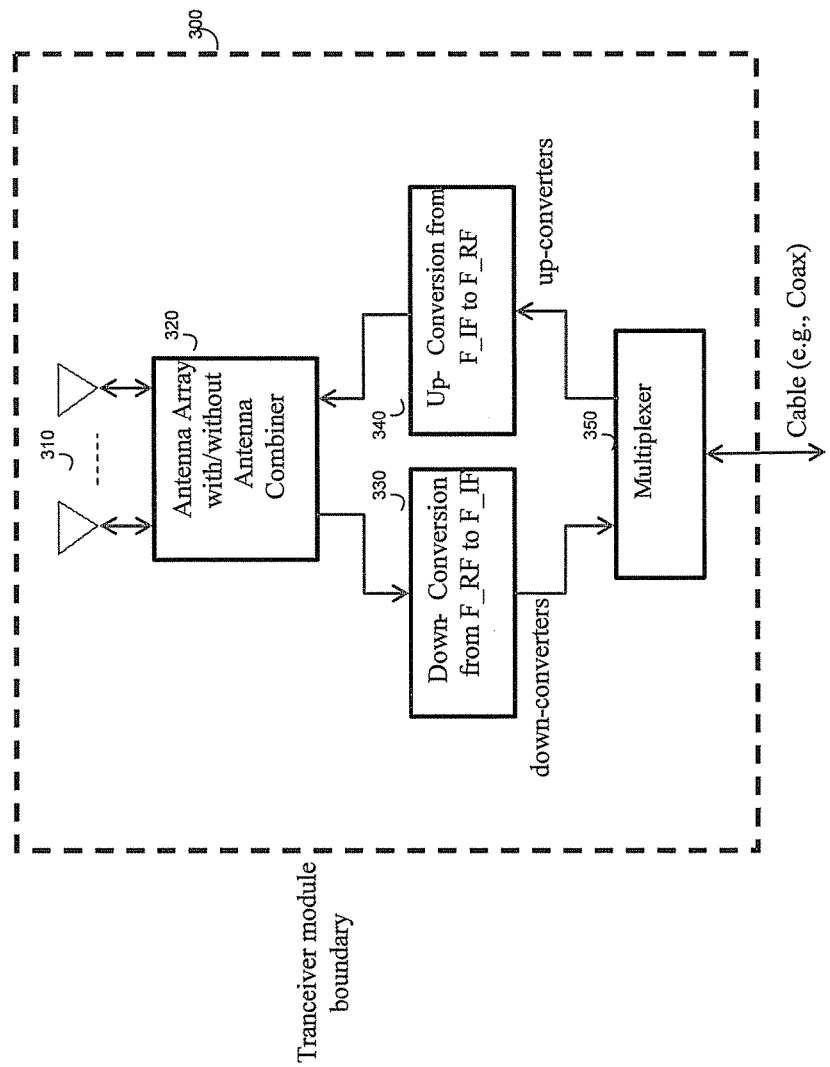
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission.

Figure 4:
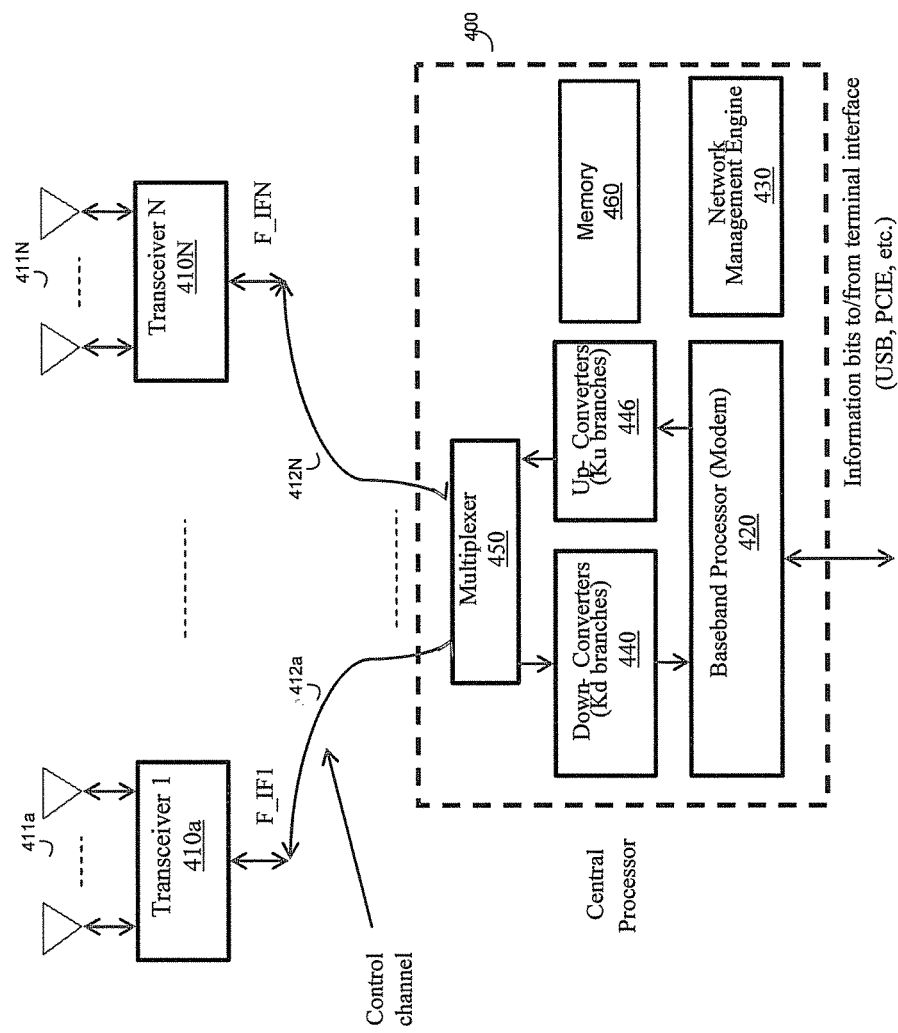
FIG. 4 is a diagram illustrating an exemplary master device with a collection of distributed transceivers that are implemented in a star topology, in accordance with an embodiment of the invention.

FIG. 4 is a diagram illustrating an exemplary master device with a collection of distributed transceivers that are implemented in a star topology, in accordance with an embodiment of the invention. Referring to FIG. 4, there is shown a central processor 400 that is connected to a collection of transceivers 410a through 410N. As shown, the collection of transceivers 410a through 410N are connected to the central processor 400 in a star topology with direct separate cables, for example, from the central processor 400 to each of the collection of transceivers 410a through 410N.

The central processor 400 comprises a baseband processor 420, a network management engine 430, down-converters 440, up-converters 446, a multiplexer 450 and a memory 460. The baseband processor 420 may comprise suitable logic, circuitry, interfaces and/or code that may be operable to provide MODEM functionality. In this regard, the central processor 400 may be operable to perform various baseband digital processing such as MIMO, OFDM, channel coding, HARQ, channel estimation and equalization, Timing/Carrier recovery and synchronization. The network management engine 430 may operate in substantially the same manner as the network management engine 218 in FIG. 2. During transmission, a baseband signal supplied from the baseband processor 420 may be translated into an intermediate-frequency (IF) signal. The up-converters 446 may further translate the IF signal to a final radio-frequency (RF) and send it over the air through an antenna array such as the antenna array 411a. For reception, the transceiver 410a, for example, may pass a received RF signal from the antenna array 411a to the down-converters 440. The down-converters 440 may translate the RF signal into an IF signal. The IF signal may further be translated to a baseband signal to the baseband processor 420, for example. The multiplexer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 420 and/or other associated component units such as, for example, the network management engine 430. The memory 360 may comprise RAM, ROM, low latency nonvolatile memory such as flash memory and/or other suitable electronic data storage.

In an exemplary embodiment of the invention, a different control channel between the baseband processor 420 and each of the distributed transceivers 410a through 410N may be utilized for configuring and managing corresponding transceivers. As shown, control channels 412a through 412N are utilized for configuring and managing the transceivers 410a through 410N, respectively.

In an exemplary embodiment of the invention, the distributed transceivers 410a through 410N may operate in various modes such as spatial diversity mode, frequency diversity mode, multiplexing mode and multiple-input-multiple-output (MIMO) mode. In spatial diversity mode, the central baseband processing 420 may be operable to utilize the distributed transceivers 410a through 410N to establish a spatial diversity link with intended end user device such as the end-user application device 220. For example, only a portion of the distributed transceivers 410a through 410N that may have strong propagation channel responses are activated and other transceivers are switched off for power saving. In another example, the distributed transceivers 410a through 410N may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central baseband processing 420 may manage the distributed transceivers 410a through 410N similar to spatial diversity mode except that each active distributed transceiver may utilize a different final carrier frequency if such frequency spectrum channel is available. In multiplexing mode, the central baseband processing 420 may manage the distributed transceivers 410a through 410N in such a way that different streams of data may be transmitted through different sets of the distributed transceivers 410a through 410N. For example, in multiplexing mode, different distributed transceivers of the distributed transceivers 410a through 410N may be dynamically programmed such that each transceiver's maximum pattern gain may be pointing to a different direction or reflector. As the environment changes (and hence location of reflectors and end user unit change), the antenna pattern of the distributed transceivers 410a through 410N may be re-adjusted. In MIMO mode, the central baseband processing 420 may manage the distributed transceivers 410a through 410N in such a way that different streams of data may be transmitted through different sets of the distributed transceivers 410a through 410N to a single receiver device such as the end-user application device 220. In an exemplary embodiment of the invention, the distributed transceivers 410a through 410N may be configured to switch between spatial diversity mode, frequency diversity mode, multiplexing mode and multiple-input-multiple-output (MIMO) mode based on corresponding propagation environment conditions, link quality, device capabilities, device locations, usage of resources, resource availability, target throughput, application QoS requirements.

In some embodiments of the invention, the interface between the baseband processor 420 and the distributed transceivers 410a through 410N may be different from an analog IF connection. In an exemplary embodiment of the invention, the distributed transceivers 410a through 410N may comprise analog-to-digital-converters (ADCs) and digital-to-analog-converters (DACs). In this case, a transceiver such as the distributed transceiver 410a may receive digital bits from the baseband processors 420 through a digital link and use its internal DAC to generate an analog waveform and then to perform the frequency up-conversion and beamforming steps for transmission. Similarly, a transceiver such as the distributed transceiver 410a may receive an RF waveform, down-convert it, and then use its internal ADC to digitize the waveform and send the digital bits over a digital connection/cable to the baseband processor 420. In other embodiments of the invention, the distributed transceivers 410a through 410N may comprise multiple digital processing blocks or units. In this case, a portion of processing within the baseband processor 420 may be moved (in terms of partitioning) to inside the transceivers boundary. In the above embodiments of the invention, one or more digital connections or interfaces between the baseband processor 420 and the distributed transceivers 410a through 410N may be implemented or deployed. The digital connections/interfaces may comprise Ethernet and various memory bus protocols.

Figure 5:
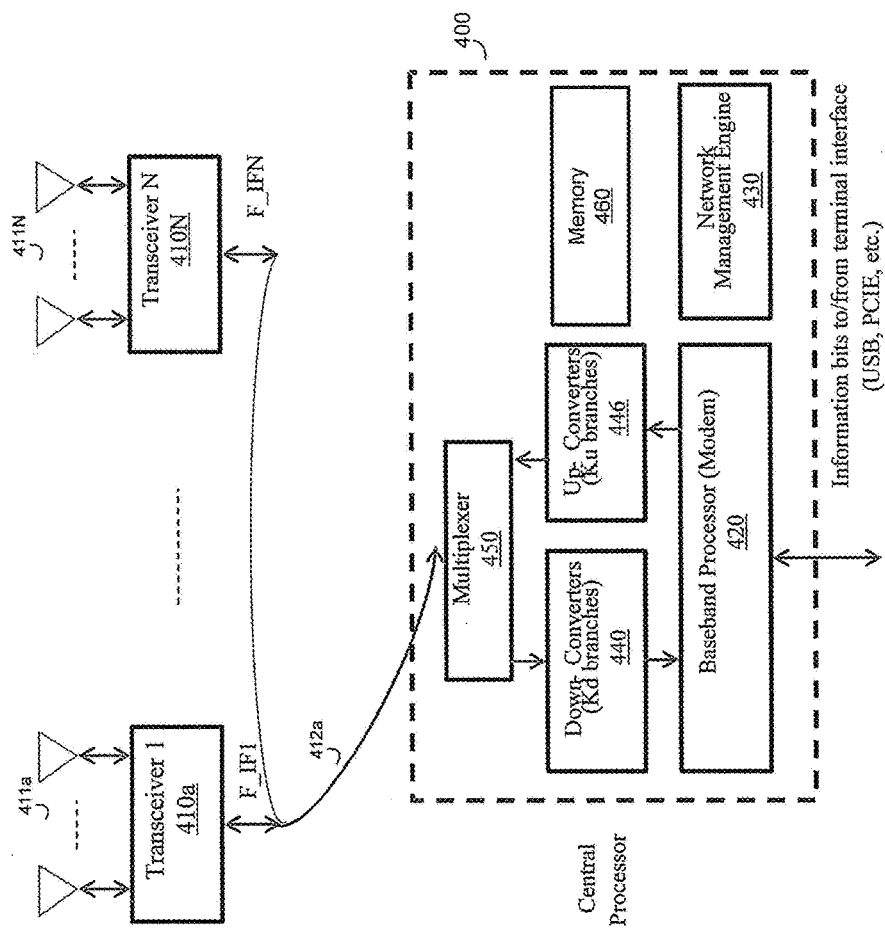
FIG. 5 is a diagram illustrating an exemplary master device with a collection of distributed transceivers that are implemented in a ring topology, in accordance with an embodiment of the invention.

FIG. 5 is a diagram illustrating an exemplary master device with a collection of distributed transceivers that are implemented in a ring topology, in accordance with an embodiment of the invention. As shown, the collection of transceivers 410a through 410N may be connected to the central processor 400 in a ring topology with a single direct cable from the central processor 400 to each of the collection of transceivers 410a through 410N. In this regard, a single control channel between the baseband processor 420 and each of the distributed transceivers 410a through 410N may be utilized for configuring the entire distributed transceivers 410a through 410N as needed. In some embodiments of the invention, the same date stream may be transported to all distributed transceivers 410a through 410N which requires only one IF channel for this communication. In other embodiments, different data streams are required to be transported to each transceiver 410a through 410N. In this usage case, each data stream may be modulated over a different IF frequency. In this regard, these IF channels may be adjacent or spaced by a gap. Each transceiver may then be configured or tuned to its corresponding/assigned IF frequency channel.

In some embodiments of the invention, the cable connection between the central processor 400 and the distributed transceivers 410a through 410N may be substituted with an optical connection, printed-board connection, Ethernet cable, or another wireless connection.

Figure 6:
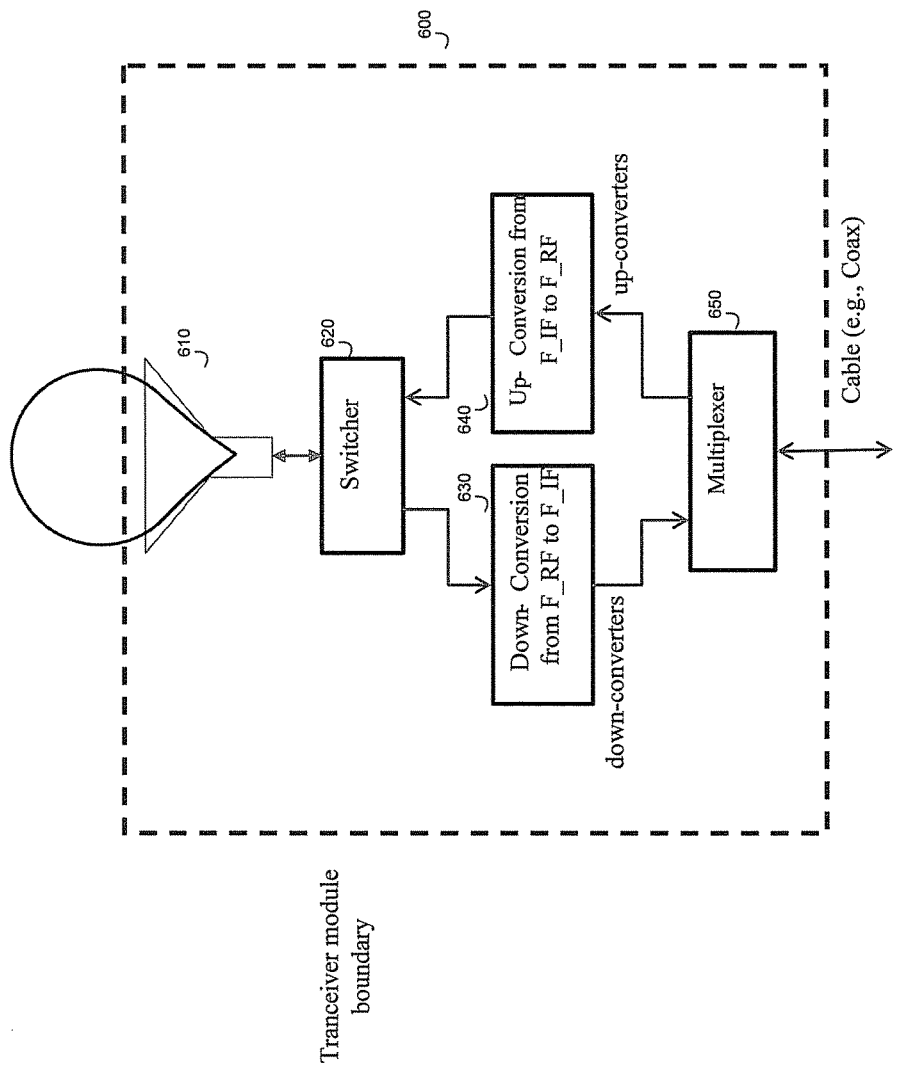
FIG. 6 is a diagram illustrating an exemplary transceiver module with a single antenna that has fixed directionality, in accordance with an embodiment of the invention.

FIG. 6 is a diagram illustrating an exemplary transceiver module with a single antenna that has fixed directionality, in accordance with an embodiment of the invention. Referring to FIG. 6, there is shown a transceiver 600. The transceiver 600 comprises an antenna 610, a switcher 620, down-converters 630, up-converters 640, and a multiplexer 650. The down-converters 630, the up-converters 640, and the multiplexer 650 may operate in substantially the same manner as the down-converters 330, the up-converters 340, and the multiplexer 350, respectively.

In an exemplary operation, the antenna 610 may have fixed directionality. In this regard, the antenna 610 with fixed directionality may be utilized to generate a fixed beam pattern, which results in the minimized amount of power amplifiers (PAs) and low noise amplifiers (LNAs) in the transceiver 600. The switcher 620 may comprise suitable logic, circuitry, interfaces and/or code that may be operable to switch on or off the transceiver 600. For example, the switcher 620 may be configured or programmed to switch on the transceiver 600 only orientated in the vicinity of the fixed directionality of the antenna 610 for power saving.

Figure 7:
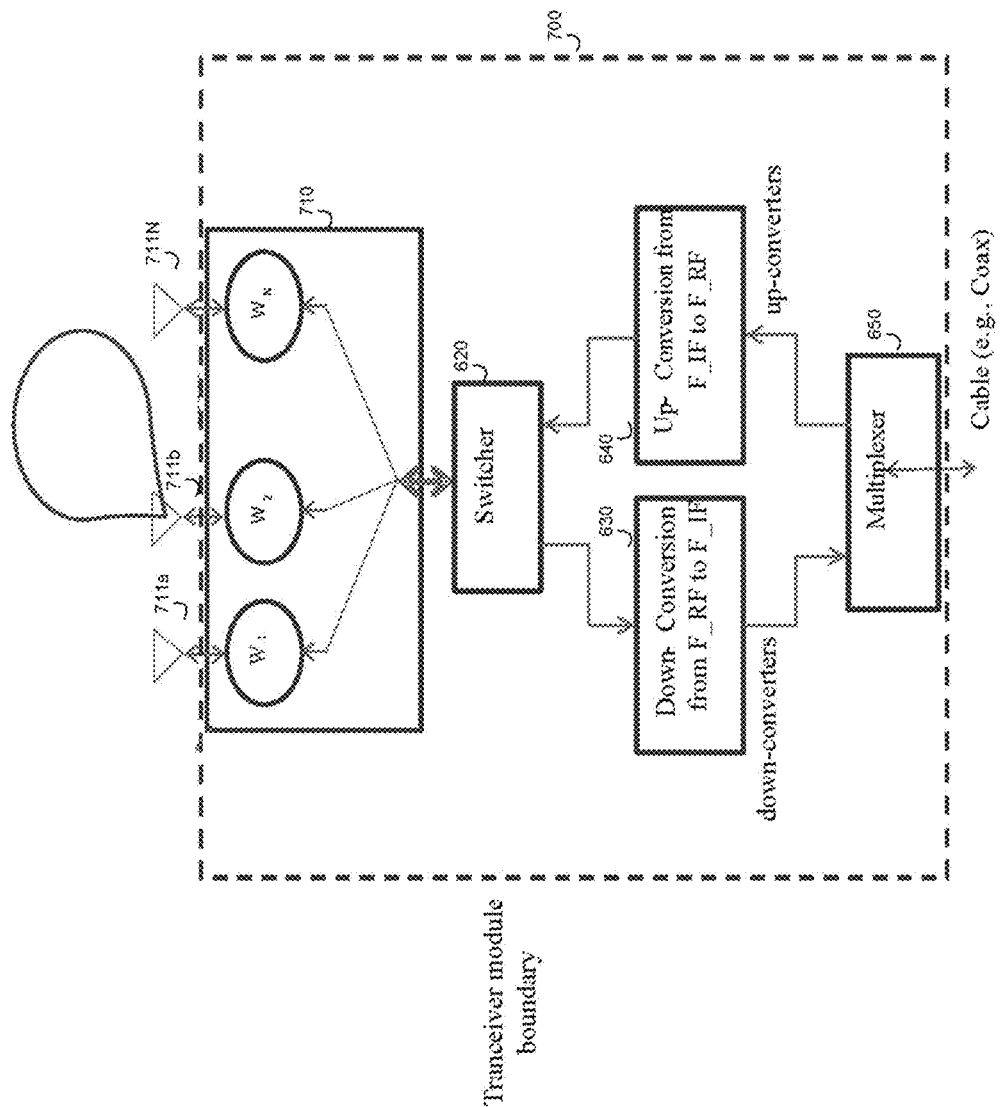
FIG. 7 is a diagram illustrating an exemplary transceiver module with a configurable phased antenna array, in accordance with an embodiment of the invention.

FIG. 7 is a diagram illustrating an exemplary transceiver module with a configurable phased antenna array, in accordance with an embodiment of the invention. As shown a transceiver 700 that comprises an antenna array 710, a switcher 620, down-converters 630, up-converters 640, and a multiplexer 650.

In an exemplary operation, the antenna array 710 may be a configurable phased antenna array. In this regard, the configurable phased antenna array 710 may have various orientations. Accordingly, the configurable phased antenna array 710 may be utilized to generate a steerable beam pattern to maximize coverage. In an exemplary embodiment of the invention, the switcher 620 may be configured to switch on only the transceivers that have strong propagation channel responses and are activated. Other transceivers may be switched off for power saving. For example, in some instances, the system identifies that transceiver 711a of the configurable phased antenna array 710 has the best LOS link to the receiver end (due to blocking objects in the room or nature of reflectors in the room). In this case, only the transceiver 711a may be switched on by the switcher 620 to transmit data to the receiver end and all other transceivers 711a through 711N of the configurable phased antenna array 710 are switched off for power saving.

Figure 8:
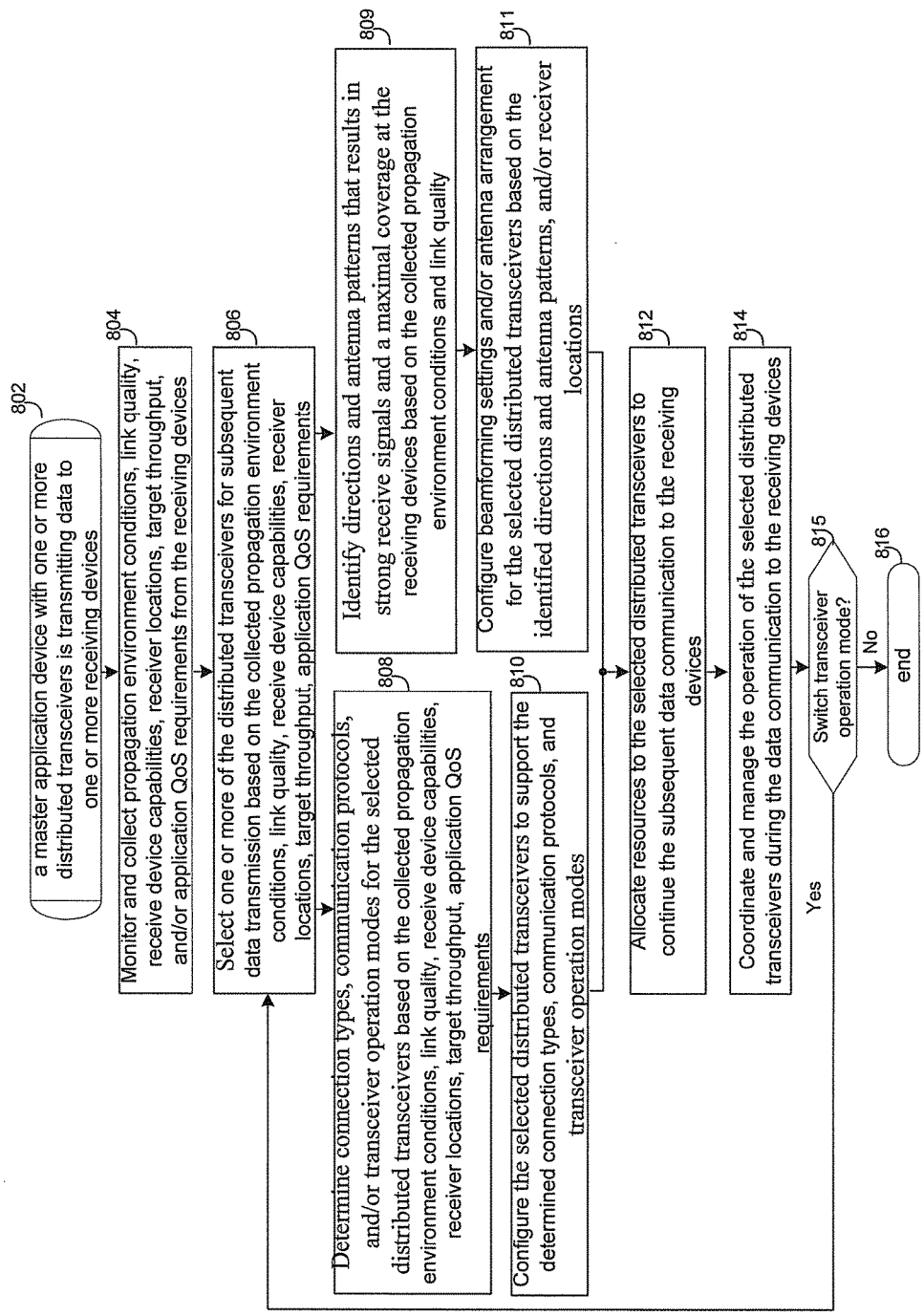
FIG. 8 is a diagram illustrating exemplary steps utilized by a master device with a collection of distributed transceivers to configure and coordinate operation of the distributed transceivers for data transmission, in accordance with an embodiment of the invention.

FIG. 8 is a diagram illustrating exemplary steps utilized by a master device with a collection of distributed transceivers to configure and coordinate operation of the distributed transceivers for data transmission, in accordance with an embodiment of the invention. Referring to FIG. 8, in step 802, the master application device 210 with one or more distributed transceivers 212a through 212e is transmitting data to one or more receiving devices such as the end-user application device 220. The exemplary steps start with step 804, where the network management engine 216 of the master application device 210 may monitor and collect communication environment information such as propagation environment conditions, link quality, receive device capabilities, receiver locations, target throughput, and/or application QoS requirements from the receiving devices through corresponding feedback channels such as the feedback channel 240. In step 806, the network management engine 216 of the master application device 210 may select one or more of the distributed transceivers 212a-212e for subsequent data transmission based on the collected propagation environment conditions, link quality, receive device capabilities, receiver locations, target throughput, application QoS requirements. The exemplary steps continue in step 808 and 809, respectively. In step 808, the network management engine 216 within the master application device 210 may determine connection types, communication protocols, and/or transceiver operation modes for the selected distributed transceivers based on the collected propagation environment conditions, link quality, receive device capabilities, receiver locations, target throughput, application QoS requirements. In step 810, the network management engine 216 of the master application device 210 may communicate with the selected distributed transceivers utilizing corresponding control channels such as the control channel 412a, for example. The network management engine 216 of the master application device 210 may configure the selected distributed transceivers so as to support the determined connection types, communication protocols, and transceiver operation modes. The exemplary steps continue in step 812.

In step 809, the network management engine 216 of the master application device 210 may identify directions and antenna patterns that results in strong receive signals and/or a maximal coverage at the receiving devices such as the end-user application device 220 based on the collected propagation environment conditions and link quality. In step 811, the network management engine 216 of the master application device 210 may be operable to configure beam-forming settings and/or antenna arrangement for the selected distributed transceivers based on the identified directions and antenna patterns, and/or receiver locations. In step 812, the network management engine 216 of the master application device 210 may allocate resources such as frequencies, time slots, processor, and/or storage to the selected distributed transceivers to continue the subsequent data communication to the receiving devices. In step 814, the network management engine 216 of the master application device 210 may coordinate and manage the operation of the selected distributed transceivers during the data communication to the receiving devices. In step 815, it may be determined whether the selected distributed transceivers need to be switched to other operation mode from the current determined transceiver operation mode. In instances where the selected distributed transceivers need to be switched to other operation mode from the current determined transceiver operation mode, then the exemplary step go back to step 806. Otherwise, the exemplary steps end in step 816.

Figure 9:
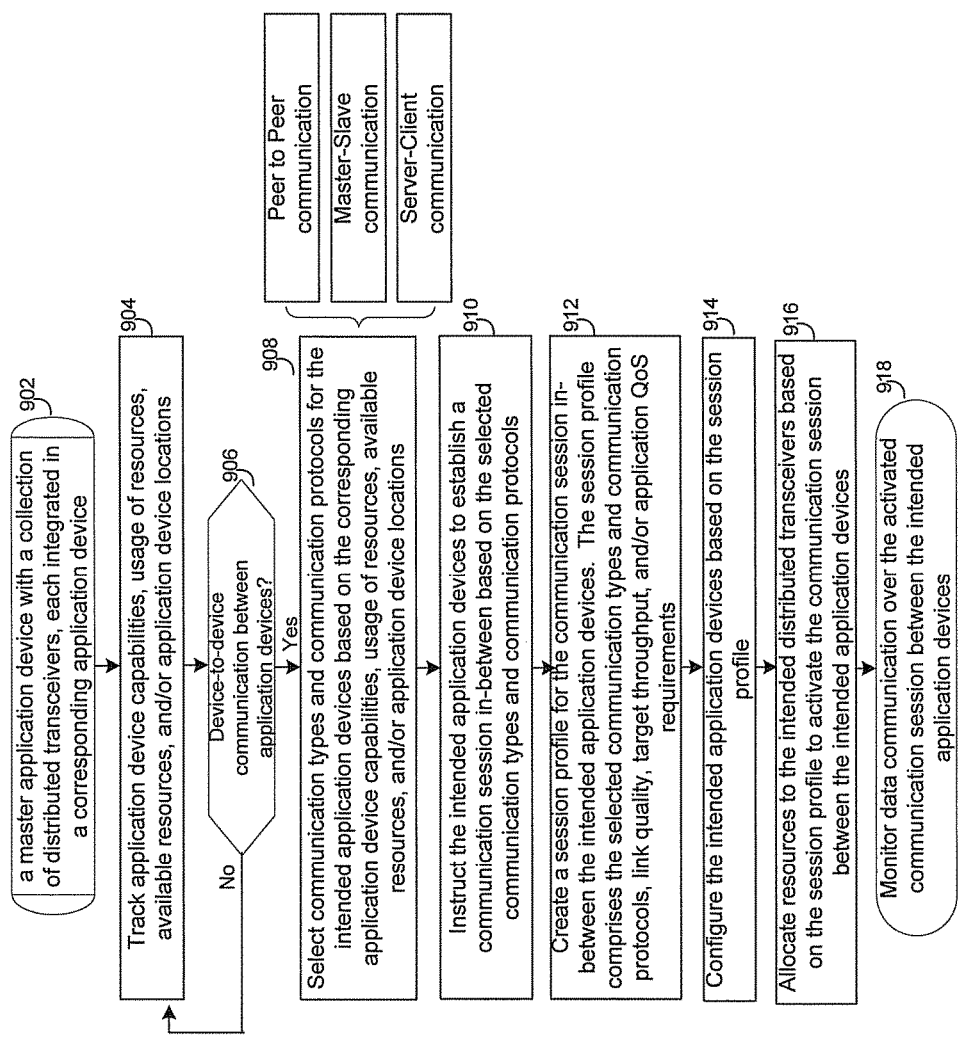
FIG. 9 is a diagram illustrating exemplary steps utilized by a master device with a collection of distributed transceivers to enable communication sessions in-between corresponding data centric application devices, in accordance with an embodiment of the invention.

FIG. 9 is a diagram illustrating exemplary steps utilized by a master device with a collection of distributed transceivers to enable communication sessions in-between corresponding data centric application devices, in accordance with an embodiment of the invention. Referring to FIG. 9, in step 902, the master application device 210 comprises one or more distributed transceivers 212a through 212e that are integrated within corresponding application devices. The exemplary steps start with step 904, where the network management engine 216 of the master application device 210 may track or monitor device capabilities, usage of resources, available resources, and/or application device locations. In step 906, it may be determined if device-to-device communication between the application devices are desirable. In instances where the device-to-device communication between the end-user application devices such as the end-user application devices 111 and 112 is required, then in step 908, the network management engine 216 of the master application device 210 may select communication types and communication protocols for the end-user application devices 111 and 112 based on the corresponding application device capabilities, usage of resources, available resources, and/or application device locations.

In an exemplary embodiment of the invention, the selected communication types may comprise peer-to-peer communication, master-slave communication and/or server-client communication. In step 910, the network management engine 216 of the master application device 210 may instruct the end-user application devices 111 and 112 to establish a communication session in-between based on the selected communication types and communication protocols. In step 912, the network management engine 216 of the master application device 210 may create a session profile for the communication session between the end-user application devices 111 and 112. The session profile comprises the selected communication types and communication protocols, link quality, target throughput, and/or application QoS requirements. In step 914, the network management engine 216 of the master application device 210 may configure the end-user application devices 111 and 112 based on the session profile. In step 916, the network management engine 216 of the master application device 210 may allocate resources to the end-user application devices 111 and 112 based on the session profile to activate the communication session between the intended application devices. In step 918, the network management engine 216 of the master application device 210 may continuously monitor data communication over the activated communication session between the end-user application devices 111 and 112. In step 906, in instances where the device-to-device communication between the application devices is required, the exemplary steps may return to the step 904.

Figure 10:
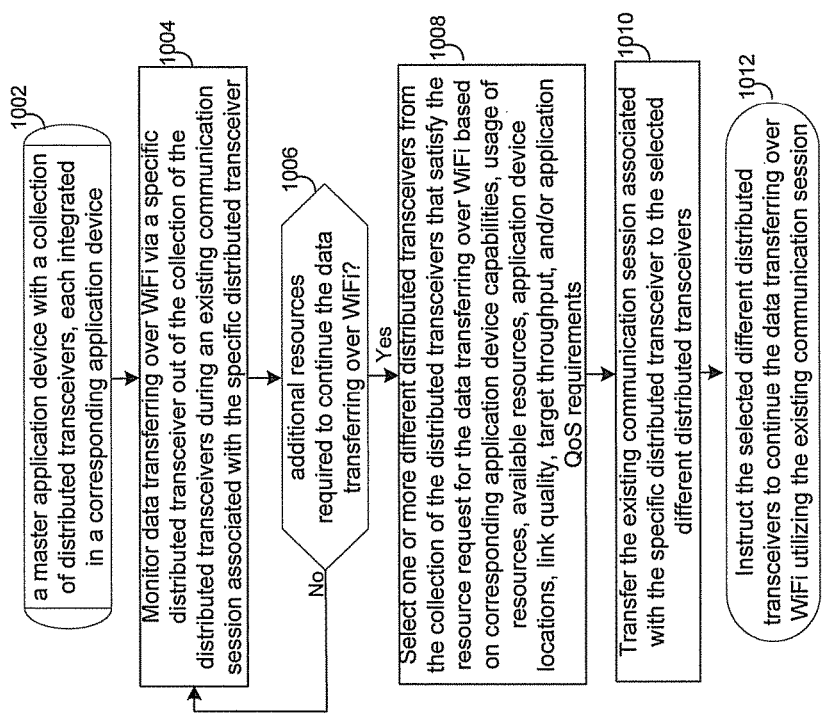
FIG. 10 is a diagram illustrating exemplary steps utilized by a device master with a collection of distributed transceivers for communication session transfer, in accordance with an embodiment of the invention.

FIG. 10 is a diagram illustrating exemplary steps utilized by a device master with a collection of distributed transceivers for communication session transfer, in accordance with an embodiment of the invention. Referring to FIG. 10, in step 1002, the master application device 210 comprises one or more distributed transceivers 212a through 212e that are integrated within corresponding application devices. The exemplary steps start with step 1004, where the network management engine 216 of the master application device 210 may be operable to monitor data transfer over WiFi, for example, via a specific distributed transceiver such as the distributed transceiver 410a out of the collection of the distributed transceivers. The distributed transceiver 410a may be integrated in the application device 118, for example. In step 1006, it may be determined if additional resources are required to continue the data transferring over WiFi. In instances where additional resources such as frequency, time slots, processors and/or memory are required to continue the data transferring over WiFi, then in step 1008, where the network management engine 216 of the master application device 210 may select one or more different distributed transceivers such as the distributed transceivers 410b and 410c for the data transferring over WiFi based on corresponding application device capabilities, usage of resources, available resources, application device locations, link quality, target throughput, and/or application QoS requirements. In step 1010, the master application device 210 may transfer the existing communication session for the data transferring to the selected different distributed transceivers 410b and 410c. In step 1012, the master application device 210 may instruct the selected different distributed transceivers 410b and 410c to continue the data transferring over WiFi utilizing the existing communication session. In an exemplary embodiment of the invention, the network management engine 216 of the master application device 210 may coordinate and manage the distributed transceivers 410a and the distributed transceivers 410b and 410c such that the data transferring over the distributed transceivers 410a is suspended or stopped before or after the distributed transceivers 410b and 410c starting the data transferring over WiFi.

Aspects of a method and system for centralized distributed transceiver management are provided. In accordance with various exemplary embodiments of the invention, as described with respect to FIG. 1 through FIG. 10, a device such as the master application device 210 comprises a plurality of distributed transceivers 212a-212e, the central baseband processor 214 and the network management engine 216. The plurality of distributed transceivers 212a-212e may be connected to the central baseband processor 214 and the network management engine 216 in the central processor 217 in a star topology or a ring topology as shown in FIGS. 4 and 5, respectively. The master application device 210 may be operable to communicate data streams that may comprise various multimedia information such as images, video, voice, as well as any other form of data utilizing one or more distributed transceivers selected from the plurality of the distributed transceivers 212a-212e to one or more other devices such as the end-user application device 220. The network management engine 216 may dynamically configure the selected one or more distributed transceivers, for example, the distributed transceivers 212a-212c, to switch between different operation modes based on corresponding link quality and propagation environment during the data communication.

In an exemplary embodiment of the invention, the central processor 217 may dynamically configure and coordinate the selected one or more distributed transceivers 212a-212c to switch back-and-forth between spatial diversity mode, frequency diversity mode, multiplexing mode and MIMO mode. The entire collection of the distributed transceivers 212a-212e may be connected to the central processor 217 in a star topology or a ring topology. The central baseband processor 214 may be operable to perform digital signal processing needed for transmit and receive operations for the selected one or more distributed transceivers 212a-212c. During the data communication, the network management engine 216 may be operable to monitor or scan communication environment information such as propagation environment conditions, link quality, device capabilities, usage of resources, available resources, device locations, target throughput, and/or application QoS requirements. In an exemplary embodiment of the invention, the network management engine 216 may identify directions and antenna patterns that results in strong receive signals and/or a maximal coverage at the receiving devices such as the end-user application device 220 based on the corresponding propagation environment conditions and link quality.

The network management engine 216 may be operable to configure beamforming settings and/or antenna arrangement for the selected one or more distributed transceivers 212a-212c based on the identified directions and antenna patterns, and/or receiver locations. In an exemplary embodiment of the invention, the network management engine 216 may determine or select connection types, communication protocols, and/or transceiver operation modes for the selected one or more distributed transceivers 212a-212c based on the corresponding propagation environment conditions, link quality, receive device capabilities, device locations, target throughput, application QoS requirements. The network management engine 216 may allocate resources such as frequencies, time slots, processor, and/or storage to the selected one or more distributed transceivers 212a-212c. The master application device 210 may continue subsequent data communication to the receiving devices such as the end-user application device 220 utilizing the allocated resources and the determined communication connection types and protocols. In an exemplary embodiment of the invention, the network management engine 216 may be operable to coordinate and manage the operation of the distributed transceivers and associated antenna or antenna array of the selected one or more distributed transceivers 212a-212c so as to share the allocated resources. For example, the network management engine 216 may monitor and manage data transferring over WiFi utilizing the distributed transceiver 410a, for example.

The distributed transceiver 410a may be integrated in the application device 118, for example. In some instances, additional resources such as frequency, time slots, processors and/or storage are required to continue the data transferring over WiFi with desired QoS requirements. In this regard, the network management engine 216 may select or identify one or more different distributed transceivers such as the distributed transceivers 410b and 410c that may be operable to support the data transferring over WiFi with the desired QoS requirements. The master application device 210 may transfer the existing communication session associated with the distributed transceiver 410a for the data transferring to the selected different distributed transceivers 410b and 410c. The resources associated with the selected different distributed transceivers 410b and 410c may be shared to continue the data transferring over WiFi utilizing the existing communication session transferred from the distributed transceiver 410a.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for centralized distributed transceiver management.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A first device comprising:
a plurality of transceivers, each transceiver of the first device comprising an antenna array comprising a plurality of antennas;
a plurality of baseband processors; and
a network management engine configured to:

establish a feedback channel between the first device and a second device to provide and negotiate configuration information;

identify a plurality of pairs of transceivers, each pair of identified transceivers comprising a corresponding transceiver from the plurality of transceivers of the first device and a corresponding transceiver from a plurality of transceivers of the second device, each transceiver of the second device comprising an antenna array comprising a plurality of antennas;

configure, for each identified pair of transceivers, (i) a beam pattern for the antenna array of the corresponding transceiver of the first device in the pair and (ii) a beam pattern for the antenna array of the corresponding transceiver of the second device in the pair;

wherein each baseband processor is configured to generate a data stream; and wherein the network management engine is further configured to communicate the data stream generated by each baseband processor in the plurality of baseband processors between a pair of transceivers in the plurality of pairs of transceivers utilizing the beam patterns configured for the pair of transceivers.

2. The device of claim 1, wherein each baseband processor is further configured to perform signal processing for a different set of transceivers in the plurality of transceivers of the first device, wherein there is no data transfer between the sets of transceivers of the first device corresponding to each baseband processor.

3. The device of claim 2, wherein each baseband processor and the corresponding set of transceivers are connected together in a star topology.

4. The device of claim 2, wherein each baseband processor and the corresponding set of transceivers are connected together in a ring topology.

5. The device of claim 1, wherein the plurality of baseband processors and the plurality of transceivers of the first device are connected in a ring topology using a single cable.

6. The device of claim 1, wherein a set of baseband processors in the plurality of baseband processors is configured to have a different set of power consumption characteristics than the other baseband processors in the plurality of baseband processors, wherein the network management engine is further configured to activate, based on a set of power consumption and throughput requirements, said set of baseband processors and deactivating said other baseband processors.

7. The device of claim 1, wherein a set of baseband processors in the plurality of baseband processors is configured to have a different set of characteristics than the other baseband processors in the plurality of baseband processors, wherein the network management engine is further configured to activate, based on a mode of operation of the first device, said set of baseband processors and deactivating said other baseband processors, wherein the set of characteristics comprises one or more of power characteristics, processing characteristics, and communication characteristics.

8. The device of claim 1, wherein each transceiver of the first device further comprises a set of digital-to-analog-converters (DACs), wherein each particular transceiver of the first device is configured to:

receive digital bits from a baseband processor in the plurality of baseband processors;

generate an analog waveform using the particular transceiver's DAC; and perform frequency up-conversion and beamforming for transmitting the waveform.

9. The device of claim 1, wherein each transceiver of the first device further comprises a set of analog-to-digital-converters (ADCs), wherein each particular transceiver of the first device is configured to:

receive a radio frequency (RF) waveform;

down-convert the RF frequency waveform;

digitize the down-converted waveform to a set of digital bits using the particular transceiver's ADC; and send the digital bits to a baseband processor in the plurality of baseband processors.

10. The device of claim 1, wherein each transceiver of the first device comprises a set of digital processing components, wherein each baseband processor is further configured to utilize one or more digital processing components of one or more transceivers of the first device.

11. The device of claim 1, wherein the plurality of transceivers of the first device are connected to the plurality of baseband processors by one of an optical connection, a printed-board connection, an Ethernet cable, or a wireless connection.

12. The device of claim 1, wherein the plurality of baseband processors are connected to each other by one of an optical connection, a printed-board connection, an Ethernet cable, or a wireless connection.

13. The device of claim 1, wherein the network management engine is further configured to configure beamforming weights of the transceivers of the first device to emulate an effective beam pattern by super positioning the beam pattern of each transceiver of the first device.

14. The device of claim 13, wherein the network management engine is further configured to adjust a direction and a shape of the effective beam pattern by adjusting a direction and a shape of the beam pattern of each transceiver of the first device.

15. A method of communication, the method comprising:

in a first device comprising (i) a plurality of transceivers, each transceiver of the first device comprising an antenna array comprising a plurality of antennas and (ii) a plurality of baseband processors:

establishing a feedback channel between the first device and a second device to provide and negotiate configuration information;

identifying a plurality of pairs of transceivers, each pair of identified transceivers comprising a corresponding transceiver from the plurality of transceivers of the first device and a corresponding transceiver from a plurality of transceivers of the second device, each transceiver of the second device comprising an antenna array comprising a plurality of antennas;

for each identified pair of transceivers, configuring (i) a beam pattern for the antenna array of the corresponding transceiver of the first device in the pair and (ii) a beam pattern for the antenna array of the corresponding transceiver of the second device in the pair;

generating a data stream by each baseband processor; and communicating the data stream generated by each baseband processor in the plurality of baseband processors between a pair of transceivers in the plurality of pairs of transceivers utilizing the beam patterns configured for each pair of transceivers.

16. The method of claim 15 further comprising:

by each baseband processor, performing signal processing for a different set of transceivers in the plurality of transceivers of the first device, wherein there is no data transfer between the sets of transceivers corresponding to each baseband processor.

17. The method of claim 16, wherein each baseband processor and the corresponding set of transceivers are connected together in a star topology.

18. The method of claim 16, wherein each baseband processor and the corresponding set of transceivers are connected together in a ring topology.

19. The method of claim 15, wherein the plurality of baseband processors and the plurality of transceivers of the first device are connected in a ring topology using a single cable.

20. The method of claim 15, wherein a set of baseband processors in the plurality of baseband processors has a different set of power consumption characteristics than the other baseband processors in the plurality of baseband processors, the method further comprising, based on a set of power consumption and throughput requirements, activating said set of baseband processors and deactivating said other baseband processors.

21. The method of claim 15, wherein a set of baseband processors in the plurality of baseband processors has a different set of characteristics than the other baseband processors in the plurality of baseband processors, the method further comprising, based on a mode of operation of the first device, activating said set of baseband processors and deactivating said other baseband processors, wherein the set of characteristics comprises one or more of power characteristics, processing characteristics, and communication characteristics.

22. The method of claim 15, wherein each transceiver of the first device further comprises a set of digital-to-analog-converters (DACs), the method further comprising:
at each particular transceiver of the first device, receiving digital bits from a baseband processor in the plurality of baseband processors;
by the particular transceiver, generating an analog waveform using the particular transceiver's DAC; and
by the particular transceiver, performing frequency up-conversion and beamforming for transmitting the waveform.

23. The method of claim 15, wherein each transceiver of the first device comprises a set of analog-to-digital-converters (ADCs), the method further comprising:
at each particular transceiver of the first device, receiving a radio frequency (RF) waveform;
by the particular transceiver, down-converting the RF frequency waveform;
by the particular transceiver, digitizing the down-converted waveform to a set of digital bits using the particular transceiver's ADC; and
sending the digital bits to a baseband processor in the plurality of baseband processors.

24. The method of claim 15, wherein each transceiver of the first device comprises a set of digital processing components, the method further comprising utilizing one or more digital processing components of one or more transceivers of the first device by each baseband processor.

25. The method of claim 15, wherein the plurality of transceivers of the first device are connected to the plurality of baseband processors by one of an optical connection, a printed-board connection, an Ethernet cable, or a wireless connection.

26. The method of claim 15, wherein the plurality of baseband processors are connected to each other by one of an optical connection, a printed-board connection, an Ethernet cable, or a wireless connection.

27. The method of claim 15 further comprising configuring beamforming weights of the transceivers of the first device to emulate an effective beam pattern by super positioning the beam pattern of each transceiver of the first device.

28. The method of claim 27 further comprising adjusting a direction and a shape of said effective beam pattern by adjusting a direction and a shape of the beam pattern of each transceiver of the first device.

* * * * *